Dec. 6, 1949  E. E. SHRADER  2,490,715
CORN HARVESTING MECHANISM
Filed Nov. 10, 1947  2 Sheets-Sheet 1
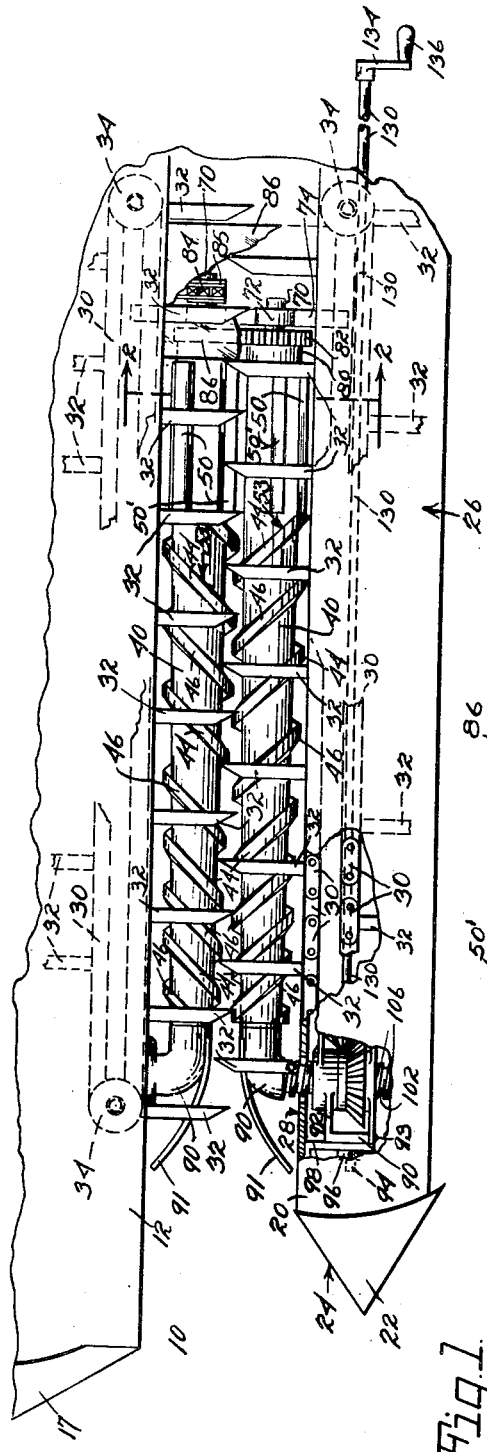
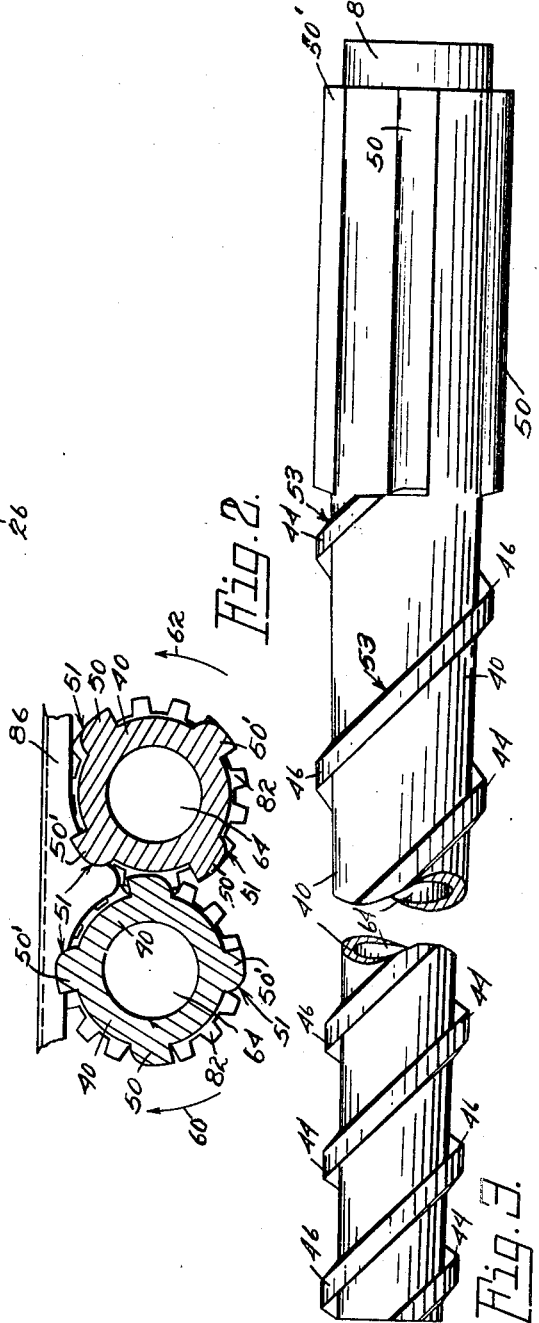
INVENTOR.
Everett E. Shrader
BY Arthur H. Sturges
Attorney.

Dec. 6, 1949 — E. E. SHRADER — 2,490,715
CORN HARVESTING MECHANISM
Filed Nov. 10, 1947 — 2 Sheets-Sheet 2
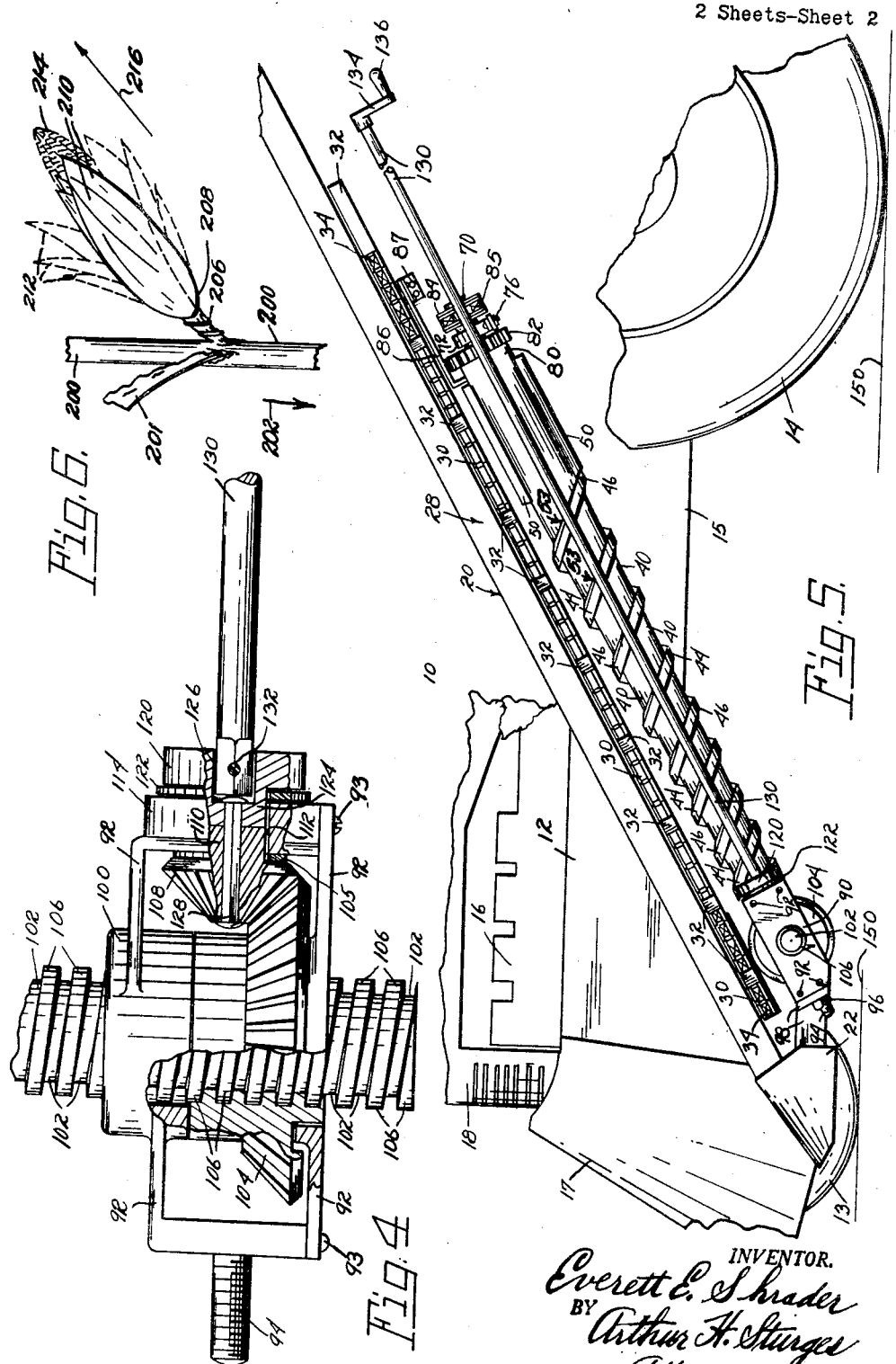

Patented Dec. 6, 1949

2,490,715

UNITED STATES PATENT OFFICE 2,490,715

CORN HARVESTING MECHANISM

Everett E. Shrader, Ravenna, Nebr.

Application November 10, 1947, Serial No. 785,123

7 Claims. (Cl. 56—18)

This invention relates to husking rolls and more particularly relates to a husking roll construction for corn pickers.

As heretofore practiced, the conventional corn pickers have utilized a pair of rolls which are driven in opposite directions for snapping ears of corn from the stalks thereof and a separate set or sets of rolls which are used for removing the husks from the ears; and the present invention aims to provide snapping rolls which also are provided with husking portions, whereby but one set or pair of rolls are necessary for consummating both snapping and husking operations.

It is also well-known that for years industry has been trying to develop a mechanical corn harvester which will pick green corn, or sweet corn, with results substantially better than hand picking. The reason why green corn has not been successfully mechanically harvested to date is because, among other reasons the corn harvesters of the prior art crush and bruise the ears, whereby the marketability of the sweet corn is destroyed. Also certain prior sweet corn pickers chop the ears of sweet corn in two.

Objects of this invention are to provide an improved corn harvesting mechanism which is particularly adapted to harvest green corn with a minimum of difficulty and which is also of an efficient construction for the harvesting of dry field corn.

Another object of the invention resides in the provision of auger-like rolls particularly adapted and arranged for cooperation with each other for consummating the guiding of corn toward the snapping rolls and at the same time for causing the lower portions of corn stalks to be discarded downwardly and outwardly of the corn harvester.

A further object of the invention is to provide a means for separating ears of corn from their stalks, said means being so constructed that the ears become separated from the stalks by a "snapping" motion applied to that portion which is known as the stem of the ear; namely that portion which is disposed between the ear and the stalks.

A further object of the invention is to simultaneously provide corn ear snapping means which simulates hand-picking by applying both a twist and pinch to a corn ear stem.

Still another object of the invention resides in the provision of corn ear snapping means and auger-like rolls, as described, which are particularly designed for synchronous cooperation with one another.

Yet another object of the invention resides in the provision of an adjusting mechanism for regulating the action of the said auger-like rolls and snapping means.

Other and still further objects and advantages of the invention will become apparent from the following detailed description of a preferred embodiment thereof.

In the drawings:

Figure 1 is a top plan view of a broken away section of one side of the forward end of a corn harvester showing the corn guiding and snapping means and the adjusting mechanism of the invention, parts of the housing of the harvester being broken away to show portions of a conveyor and portions of the adjusting mechanism, remaining portions of the conveyor and of the adjusting mechanism being shown in dotted lines;

Figure 2 is a view-in-section taken along the line 2—2 of Figure 1;

Figure 3 is a top plan and enlarged view of one of the corn guiding and snapping rolls of the invention, a portion thereof being broken away;

Figure 4 is a top plan detailed view of the gear and worm screw portion of an adjusting mechanism employed; parts thereof, and other parts of the adjusting mechanism, being broken away; and Figure 5 is a side elevation of the invention shown as applied to a tractor mounted corn harvester, parts of the latter being broken away.

Figure 6 is a frontal elevation of a broken away portion of a corn stalk.

The device of this invention is for attachment to and use with corn pickers of conventional construction, the majority of which are tractor-mounted. One of the latter is generally indicated at 10 in Figures 1 and 5. The corn harvester 10 is provided with a center housing 12 adapted to extend around the forward side of a tractor, the front and rear tires, the frame, and the engine block, of which latter are respectively shown at 13, 14 and 15, and 16 in Figure 5. The housing 12 is provided with a forward apron 17 extending outwardly and downwardly of the forward side of the radiator grill 18 of the tractor. Any self-propelled vehicle may be employed in lieu of a tractor.

The forward edge of the apron 16 is inclined outwardly and rearwardly from the sides of the forward end of the tractor grill 18 for guiding corn between the adjacent side of the housing 12 and a harvester unit support housing 20.

The latter is disposed alongside and spaced apart from the adjacent side of the center housing 12 providing a passage therebetween extending rearwardly of the forward end of the corn-harvester for the purpose of receiving cornstalks as later described.

A similar harvester unit housing, not shown, is disposed upon the other side of the center housing 12.

At its forward end the harvester unit housing 20 is also provided with an apron 22 which latter is provided with a forward surface 24 inclined inwardly and rearwardly thereof for guiding corn stalks into a position between the housings 12 and 20. The housing 20 consists of an inverted U-shaped shield having a top surface 26 and downwardly extending side plates 28 at either side thereof.

As is also conventional, the harvester 10 is provided with conveyors disposed one on each of the oppositely disposed elongated sides of the housings 12 and 20. The conveyors are each provided with an endless chain having links 30. Flights 32 extend outwardly from each of the oppositely disposed sides of the housings 12 and 20 and are preferably positioned at a right angle thereto.

The chains formed by the links 30 are each respectively disposed around one of two spaced apart pairs of pulleys 34, which latter are adapted to rotate in approximately horizontal planes, the flights 32 being at all times disposed on the outer side of the chains 30 from the pulleys 34.

The two pairs of pulleys 34 are disposed one pair on each of the oppositely disposed sides of the housings 12 and 20. The pulleys 34 of each pair are spaced apart forwardly and rearwardly of each other.

The housing 20 and the conveyor belts 30 are inclined upwardly toward the rearward end of the housing and a pair of harvesting rolls, best seen in Figure 1 at 40, are similarly inclinedly disposed upwardly toward the rearward end of the harvester. The pairs of rolls 40 are positioned, one pair each, between each of the harvester unit housings 20 and the adjacent side of the center housing 12, one pair of rolls being on each side of the center housing 12.

The rolls 40 are disposed side by side and substantially in alignment with the direction of travel of the corn picker.

The rolls 40 are each of like construction and are preferably of circular cross-section having a taper from a wider, upper and rearward end to the narrower, forward and lower end. This is so that when the rolls 40 are disposed side by side in use there will be a wider space therebetween at their forward end for receiving corn stalks.

Each roll 40 is provided with one or more, and preferably two, helically disposed, spaced apart ridges 44 and 46 secured to the perimeter thereof. Each convolution of the ridges 44 is disposed on the opposite side of its respective roll 40 with respect to the corresponding convolution of the other ridge 46; in other words, the helical ridge of one roll winds clockwise and of the other roll counter-clockwise.

The distance between the convolutions of the ridges 44 and 46 is progressively greater from the narrower forward end of each of the rolls towards the wider, rearward end thereof. This is for the purpose of urging the corn-stalks to travel rearwardly with respect to rolls 40 at approximately a uniform rate at the rearward end of the rolls with respect to the forward end of the rolls.

Greater spacing is necessary at the rearward end of the rolls because, as best shown in Figure 1, the rolls of a set are normally positioned closer together at their rearward ends than at their forward ends. Also because the rolls taper to wider rearward ends. This closer roll spacing and taper tends to speed up the rearward travel of the corn stalks while at the same time the greater spacing upon the ridges tends to slow it down, thereby resulting in approximately the same even rate of corn stalk travel at the rearward end of the rolls as at the forward end of the rolls.

A further advantage of the greater spacing of the ridges at the rearward end of the rolls is that this tends to prevent premature snapping off of the ears of the corn, which latter is preferably done by later described lugs.

The rolls 40 are each provided at their rearward wider end with a plurality of, and preferably four, approximately equidistantly, radially spaced apart, elongated straight lugs 50 and 50', the latter being disposed about the perimeter of the wider, rearward end of the respective roll 40 and symmetrically arranged about and in parallelism with the axis of such rolls.

The lugs are arranged in two pairs, 50 and 50'. The lugs 50 of a roll are oppositely disposed with respect to each other, as are also the lugs 50' of a roll. The ridges 44 and 46 of a roll each terminate between one lug 50 and its adjacent lug 50'.

As the rolls 40 rotate toward each other at their upper side, the ridges 44 and 46 present a leading edge or forward edge on one side thereof. That side or edge is shown at 53 and is best seen in Figure 3.

The ridges 44 and 46 terminate between one lug 50 and its adjacent lug 50' in such a position that the leading side 53 of each ridge is preferably midway between the said one lug 50 and adjacent lug 50'.

The lugs 50 are disposed closer to the ridges 44 and 46 than the ridges 51' and, consequently the lugs 50 contact the corn stalk and stem before the lugs 50'. As a result the lugs 50 snap the corn ear off as later described and in addition to pulling the stalk downwardly while the lugs 50' only tend to pull the stalk downwardly, without snapping.

The ridges 44 and 46 terminate at one end at points spaced apart from the wider rearward end of their respective rolls 40 and common ends of the lugs 50 are disposed close to the adjacent ends of the ridges 44 and 46.

The lugs 50 are preferably approximately of rectangular shape in transverse cross-section, those longitudinal corners or sides 51 of the lugs 50 which are forwardly disposed with respect to the direction of rotation of the rolls 40 being rounded for preventing injury to ears of corn.

This is best illustrated in Figure 2, the arrows 60 and 62 indicating the direction of rotation of their respective adjacent rolls. As shown, the rolls 40 rotate in opposite directions toward each other on their upper sides and downwardly on their oppositely disposed surfaces during operation. This is for the purpose of causing corn stalks engaging therebetween to be pulled downwardly through the rolls 40 as later described.

Means are provided for pivotally mounting the rolls 40 between the housings 12 and 20; and for this purpose, the rolls 40 are preferably of hollow centered construction having a cylindrical bore 64 therethrough.

At the rearward end of the rolls 40 the latter are each provided with a shaft 70 extending into and outwardly of the bores 64. The shafts 70 are each pivotally secured in one of two bearings 72 and the latter are supported from the adjacent side of the housings 12 and 20 by means of a suitable supporting bracket 74 which is secured by means of bolts 76 to the housings 12 and 20. The bearings 72 are spaced apart along the bracket 74 in positions for maintaining the rolls 70 side by side. At the rearward end of each of the rolls 40 the latter are each provided with an end portion 80 which latter each extend rearwardly of and beyond the rearward ends of the lugs 50.

One of a pair of pinions 82 are concentrically attached to each of the end portions 80 and the teeth of the pinions 82 of each pair of rolls 40 are intermeshed, so that the rolls 40 will be forced to rotate in synchronism.

Means are provided for driving one of the rolls 40 from the motor of the tractor and such means includes a sprocket wheel 85, the latter being secured to the shaft 70 of those rolls 40 which are disposed nearest the housing 12 on either side of the latter.

The pinions 82 and sprocket chain 84 are protected from passing corn by a shield 86 best seen in Figure 5. The shield 86 is disposed in parallelism with the axes of the rolls 40 and is provided with a downwardly extending portion at its forward end which is disposed between the rearward end of the lugs 50 and the forward side of the adjacent pinions 82.

At its rearward end the shield 86 is secured by means of suitable brackets 87 to the adjacent sides of the housings 12 and 20.

At their forward ends, the rolls 40 are each rotatably secured in a suitable bearing 90. The bearings 90 are each of an L shape in top plan as shown in Figure 1. One arm of the L of each bearing is disposed in alignment with its respective roll and the bearings and rolls are each pivotally interconnected by means of a short shaft, not shown, extending into said bearing and into the bore 64 of the corresponding roll. The other arm of each L-shaped bearing which is adjacent the central housing 12 is preferably rigidly secured thereto.

The two guides 91 are provided for each set of two rolls 40 and the guides 91 are of arcuate shape and are attached, one each, to each of the bearings 90 at the oppositely disposed surfaces of the latter. The guides 91 are each curved outwardly and forwardly from the space between the forward ends of the rolls 40. The forward ends of the guides 91 extend to points close to the sides of the housings 12 and 20.

The annular frame 92 is generally rectangular in top plan view as best seen in Figure 4, and secured to one side of the frame 92 a bearing 100 is provided through which a threaded shaft 102 is slidably disposed.

A bevel-toothed gear having a toothed main body portion 104 is disposed about the shaft 102 between the sides of the frame 92, and the gear 104 has a center portion 105 protruding on each side of the main body portion 104. The portion 105 has a threaded center bore in engagement with the threads 106 of the shaft 102.

A second and smaller bevel-toothed gear having a main body portion 108 is rotatably secured to that end of the frame 92 which is opposite the bolt 94. The second gear 108 is disposed in threaded engagement with the first gear 104. Between the gear main body portion and the adjacent surface of the frame 92 a washer 105 is disposed.

A cylindrical protruding portion 110 is attached to the main body portion 108 and is disposed within a cylindrical bore 112 which latter extends through the adjacent side of the frame 92 and through a bearing block 114.

The bearing block 114 is secured to the rearward side of the frame 92 and the cylindrical gear portion 110 extends only partway through the block 114.

A receptacle 120 is disposed to the rear of the block 114 and a washer 122 is positioned between the block 114 and the receptacle 120. The receptacle 120 is provided with a forwardly protruding cylindrical portion 124 of slightly lesser diameter than the bore 112.

The rearward side of the receptacle 120 is provided with an elongated recess 126 of a square cross-section. The recess 126 is concentric with the cylindrical receptacle portion 124 and does not extend completely through the forward side of the receptacle portion 124.

A square bar 128 is disposed through a close-fitting passage 130 which latter extends through the main body portion of the gear 108, and through the forward side of the receptacle 120, and into the recess 126.

The ends of the bar 128 are peened against the forward side of the gear 108 and against the forward wall of the recess 126.

As thus described the receptacle 120 and gear 108 are adapted to rotate simultaneously in the bearing block 114.

The adjusting means further includes an adjusting rod 130 having a square forward end adapted to be received in the recess 126. If desired a pin 132 may be employed for permanently securing the rod 130 to the receptacle 120.

The upper and rearward end of the rod 130 is provided with a crank 134 having a handle 136 within the reach of the driver of the corn harvester so that the handle 136 may be used to adjust the spacing of the rolls 40.

In operation, as the corn harvester is driven across the surface of the ground 150 and down rows of corn to be picked, the corn stalks are guided by the aprons 16 and 22 and by the guides 91 into engagement with and between the rolls 40.

The forward motion of the harvester, the rearward movements of the conveyor flights 32 as they pass above the rolls 40, and the helical ridges 44 and 46 on the rotating rolls 40 all tend to cause the corn-stalks to travel rearwardly of the rolls 40.

During their rearward travel the cornstalks are pushed downwardly of the rolls 40 because of their downward rotational movement at their oppositely disposed surfaces.

The two rolls 40 of each set are spaced apart a greater distance at their forward ends than at their rearward ends and the spacing of the convolutions of the ridges 44 and 46 is greater at the rearward ends of the rolls 40. These two characteristics tend to prevent unwanted engagement of the ridges of the two rolls of a set.

It will be seen that the spacing of the forward ends of the rolls of a set can be regulated by the handle 136 which in turn rotates the rod 130 and gears 104 and 108, causing the wormscrew shaft 102 to move the attached bearing 90 toward or away from the other bearing 90 of the same set of rolls for moving the later toward or away from each other.

The spacing of the forward ends of the rolls 40 will generally be as shown in Figure 1, although the spacing can be varied to advantage for different diameters of corn stalks 200 and for different kinds of corn, as result from differing soil and weather conditions in the various parts of the world.

When the stalks 200 reach the lugs 50 the lower part of the stalks and lower ones of the ears 201 have usually been disposed of and the lugs snap off the ears in a manner later described and varying with respect to whether the corn is green or dry field corn. The remainder of the stalks is urged downwardly and outwardly of the rolls and of the harvester.

With respect to field corn, it is harvested in the fall of the year when the stalks are dry and the fibres thereof are tough, and at said time the stems 206 of the ears, best shown in Figure 6, are also dry and tough, whereby at the time the stalk reaches the upper ends of said threads, said downward motion of the stalk being continued, the stem 200 of the stalk contacts with the lugs 50 and 50', which are adjacent to the ends of the said thread, the threads 44 and 46 there cooperate with each other to provide a twisting motion and a pinching motion to the stem 206 and during the downward travel of the stalk 200. Simultaneously the end 208 of the ear, being larger in diameter than the slight space between the rolls, upon abutting said rolls, causes the leaves 210 of the husk to flare outwardly with respect to the ear of corn, said flaring outwardly being represented by the dotted lines at 212.

This causes the end of the ear at 214 to become bare, said end being the end where the corn silk normally exudes through the ear at the time the husks are close together.

The ends of the husks adjacent the ends of the ear are foliated and folded one upon the other during a growing of the ear, and the ends of the foliage or husk adjacent the free end of the ear are somewhat open, said opening being filled with corn-silk. This arrangement of parts, provided by nature, is taken advantage of by the new mechanism, whereby when the said husks are spread apart with respect to each other, the ear 214 is permitted to "pop" or move outwardly from the husk leaves in the direction of the arrow 216 on account of a breakage of the stem 206 and at times when the machine is harvesting dry or ripe field corn in the fall of the year.

With respect to green corn the operation is substantially similar and it will be understood that the picking operation is the same as above described, except that since the foliage on the ear is green the leaves of the ear do not spread and the ear does not "pop" out of its husk as above described. However, since the stem of a green ear is soft, the stem becomes pinched in two by the above described twisting and the gripping action of the mechanism at the time the green stalks move in the direction of the arrow 202.

The resulting product is the same except that with green corn the husk remains on the ear as it is desirable for protection of the soft milky kernals of green corn during a marketing and handling of the latter.

Following snapping of the ears, the latter are then carried by the conveyor flights 32 rearwardly of the rolls across the shield 86 to husking rolls, not shown, if the corn is to be husked as is conventional with field corn, or are carried directly to a hopper if the corn is to be sold in unhusked condition as is common with sweet corn.

The rolls 40 may be attached to conventional cornpickers and the latter, if provided with husking rolls, may be adapted to picking sweet corn, without husking the same, by changing the construction of the shield 86 so that it extends rearwardly to cover the conventional husking rolls, not shown in the drawings.

This invention has provided an improvement in corn harvesters which is designed to pick corn, and particularly green corn, at a greater speed and with less clogging than heretofore and which is designed for use with conventional corn harvesters.

From the foregoing description, it is thought to be obvious that a corn harvesting mechanism constructed in accordance with my invention is particularly adapted for use by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

I claim:

1. In a corn picker having a corn-stalk receiving passage extending rearwardly from the forward end thereof, the combination comprising a first elongated roll and disposed in said passage and substantially disposed in alignment with the direction of travel of said corn-picker, said roll having at least one helically disposed ridge secured to its perimeter and extending along said roll to a point spaced from the rearward end thereof; a plurality of radially equidistantly spaced apart elongated lugs disposed about the perimeter of said roll and between said ridge and said rearward end, said lugs being longitudinally disposed with respect to said roll; a second roll disposed alongside said first roll, said second roll being similarly constructed to said first roll with an exception in that the helical ridge of said second roll winds in an opposite direction to the ridge of said first roll, said ridges on said rolls being disposed terminating in such positions that that leading edge of each ridge which is disposed in the direction of rotation of its corresponding roll is disposed between two adjacent ones of said lugs, said rolls being so disposed with respect to each other that their oppositely winding ridges tend to urge cornstalks rearwardly of said rolls in operation and at times when said rolls are caused to rotate in opposite directions downward at their oppositely disposed surfaces; means for rotatably securing said rolls to said cornpicker; and means for causing said rolls to rotate in opposite directions downward at their oppositely disposed surfaces.

2. The combination of claim 1 in which the lugs of each of said rolls are each provided with a rounded surface on that longitudinal side thereof which is disposed in the direction of rotation.

3. The combination of claim 1 in which the ridges on each roll are two in number and the lugs on each roll are four in number.

4. The combination of claim 1 in which the lugs of each of said rolls are intermeshed in operation.

5. The combination of claim 1 in which the convolutions of said helical ridges are spaced progressively farther apart toward the rearward end of the rolls, and in which said rolls are each circular cross section, tapering progressively from smaller diameters at their forward ends to larger diameters at their rearward ends.

6. As an article of manufacture, a roll for a corn picker having a helically winding outstanding ridge extending to a point spaced apart from one end of said roll, said ridge having a normally leading edge; a plurality of equidistantly spaced apart longitudinal lugs disposed at said one end, said ridge terminating in such position that said leading edge terminates between two adjacent ones of said lugs.

7. As an article of manufacture, a roll for a corn picker having a helically winding outstanding ridge extending to a point spaced apart from one end of said roll, said ridge having a normally leading edge; a plurality of equidistantly spaced apart longitudinal lugs disposed at said one end, said ridge terminating in such position that said leading edge terminates approximately midway between two adjacent ones of said lugs.

EVERETT E. SHRADER.

REFERENCES CITED

The following references are of record in the file of this patent:

UNITED STATES PATENTS

| Number | Name | Date |
| --- | --- | --- |
| 905,408 | Calkins | Dec. 1, 1908 |
| 1,424,060 | Zeier | July 25, 1922 |
| 2,293,757 | Jochumsen | Aug. 25, 1942 |

FOREIGN PATENTS

| Number | Country | Date |
| --- | --- | --- |
| 443,013 | Great Britain | Feb. 14, 1936 |